United States Patent [19]
Mina

[11] Patent Number: 6,106,187
[45] Date of Patent: Aug. 22, 2000

[54] TORQUE TRANSMITTING DEVICE FOR TRANSMITTING TORQUE WITHOUT PLAY BETWEEN A SHAFT AND A BODY COMPLEMENTARY THERETO

[75] Inventor: Livio Mina, Brescia, Italy

[73] Assignee: Utensileria Schneider SRL, Italy

[21] Appl. No.: 09/054,593

[22] Filed: Apr. 3, 1998

[30] Foreign Application Priority Data

Apr. 22, 1997 [IT] Italy .................................. BS97A0034

[51] Int. Cl.⁷ .................................................. B25G 3/25
[52] U.S. Cl. .......................... 403/356; 403/376; 403/404; 403/355; 464/182
[58] Field of Search .................................. 403/356, 355, 403/404, 375, 376; 464/182, 179

[56] References Cited

U.S. PATENT DOCUMENTS

| 3,014,332 | 12/1961 | Hubbard | 403/356 X |
| 3,436,106 | 4/1969 | Luenberger | 403/356 |
| 4,350,463 | 9/1982 | Friedline | 409/232 |

FOREIGN PATENT DOCUMENTS

| 2652393 | 3/1991 | France | 403/356 |
| 325016 | 9/1920 | Germany | 403/356 |
| 435284 | 10/1926 | Germany | 403/356 |
| 65744 | 10/1972 | Poland | 403/356 |

*Primary Examiner*—Terry Lee Melius
*Assistant Examiner*—John R. Cottingham
*Attorney, Agent, or Firm*—William W. Jones

[57] ABSTRACT

A torque transmitting device between a shaft (1) and a body (3) having a bore appropriate for the shaft comprises a pin (12) received in mutually complementary and facing recesses in the shaft and the body (1, 3), respectively. The center (O) of the pin (12) is offset outwardly (as an alternative: inwardly) with respect to the circumferential line of the shaft (1) and the bore, respectively, so that an entraining force component does not only extend in tangential direction to the shaft surface and the bore wall, respectively, but has an inclination so that a radial component is created as well through which the position of the shaft (1) is defined without play within the bore of the body (3). This coupling can be provided such that the axis of rotation in operation is the same as the axis of rotation predetermined by manufacture.

9 Claims, 1 Drawing Sheet

TORQUE TRANSMITTING DEVICE FOR TRANSMITTING TORQUE WITHOUT PLAY BETWEEN A SHAFT AND A BODY COMPLEMENTARY THERETO

The present invention in general concerns couplings between shafts and members supposed to rotate in unison, and in particular the invention relates to a torque transmitting device between a shaft and a body complementary thereto.

The coupling between a shaft and a bore appropriate therefor in a body, according to the prior art, takes place with the aid of a groove key (which also is to be understood in the sense of a feather key or tongue) which usually is disposed in axial relation to the shaft and engages a corresponding axial recess formed in the wall of the bore of the body to be coupled. The groove key usually has mutually parallel walls so that the force during torque transmission in case of such an arrangement acts substantially in tangential direction with respect to shaft and bore.

The same condition is also present in case of a coupling between a milling cutter spindle and a milling cutter. Due to the fact that the present invention has its main advantages in such a coupling of milling cutter spindle/milling cutter, the following description of the invention is to relate specifically to such an application, without the intention of restricting the scope of protection of the invention thereby.

The national and international harmonization standards provide the following tolerances for a spindle/milling cutter coupling: H7 for the bore, h6 for the spindle. This means e.g. for a diameter of 32 mm a mounting margin of up to 0.05 mm. When considering that the maximum admissible concentricity error between the cutting edges of the milling cutter proper usually is 0.02 mm, it becomes clear that such play of the coupling of milling cutter/milling cutter spindle may result in concentricity errors that cannot be brought in agreement with the values admissible at maximum.

The above-discussed problem is known and so far attempts have been made for solving it with the aid of devices that were always complicated and expensive, for example hydraulic devices, which among other things have a very low range of expansion.

In contrast thereto, the present invention solves the problem with a completely novel means that is designed such that the force applied does not only produce a tangential driving or entraining component, but also a suffficiently large transverse component which urges the surface of the spindle in radial direction against the bore wall and in doing so eliminates the transverse play of the coupling. The particularly advantageous effect of the invention can be explained as follows:

During manufacture of a milling cutter (with cutting tips or plates) or during grinding thereof, the axis of rotation is defined by the radius of the bore, and the spindle is unequivocally contacted with the bore wall, i.e. at all times at the same position. In operation, the spindle later on also establishes contact with the bore wall at exactly that position, whereby the axis of rotation in use coincides with the axis defined due to manufacturing conditions.

This is why, both in the installation position defined by manufacture and during operation, the installation play becomes zero, and the axis of rotation is defined unequivocally and is always located at the same position.

In the following, the invention will be elucidated in more detail by way of embodiments with reference to the drawings in which FIG. 1 shows a cross-sectional view of an embodiment of a coupling according to the invention in the unloaded condition;

Figure 5:
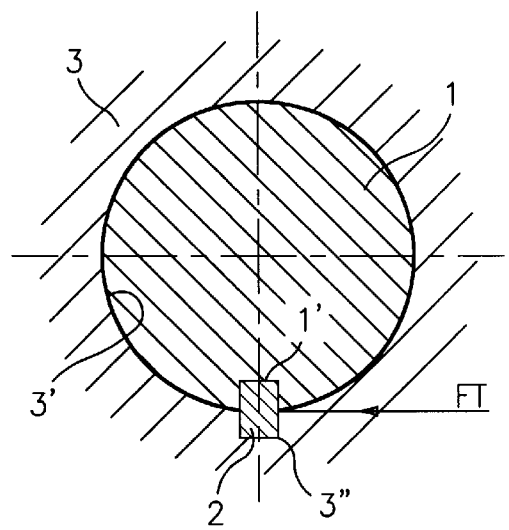
FIG. 5 shows a cross-sectional view of a rotational coupling between a shaft and a body appropriate therefor according to the prior art.

FIG. 5 shows a conventional coupling or driving device. The drawing shows a shaft 1 (spindle or trunnion); a receiving means 1' for a groove key 2; a body 3 coupled therewith; the bore 3' of the coupling; the recess 3" for insertion of groove key 2. In FIG. 5, FT designates the driving or entraining force which, due to the fact that the groove key is formed in conventional manner with parallel edges, takes a direction which is substantially tangential with respect to shaft 1 and consequently also with respect to coupling bore 3.

Figure 1:
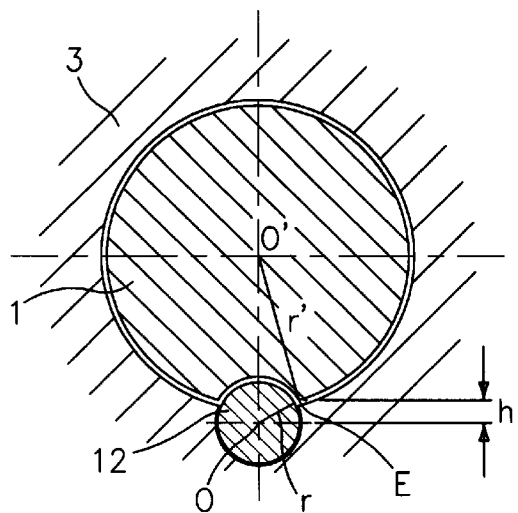
Figure 4:
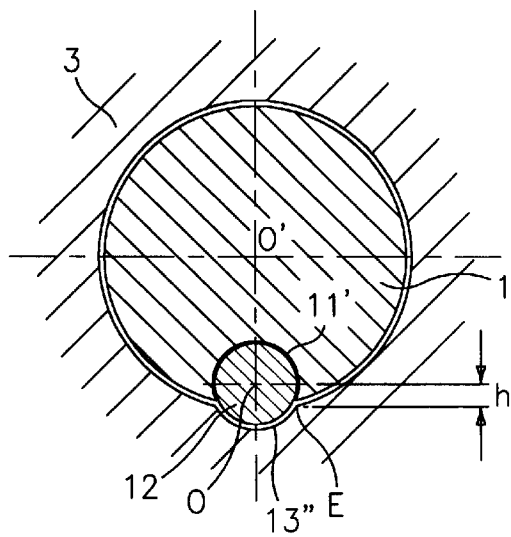
FIG. 4 shows a modified embodiment of a coupling between a shaft and a body appropriate therefor.

FIG. 1 schematically shows the present invention. In this figure, just as in FIGS. 2 and 4, the parts identical with corresponding parts of FIG. 5 are designated with the same reference numerals. According to the invention, the driving or entraining member 12 which corresponds to groove key 2 and in the following will be referred to simply as "pins" has no cross-section with parallel edges as in the prior art. In the embodiment shown, the pin is of circular cross-section having a radius r and a center O, and the pin is received in two mutually complementary recesses 11' and 13", with the recesses being formed in mutually confronting manner in shaft 1 and the bore 3', respectively, of the body 3 coupled with the shaft. FIG. 1 shows furthermore at O' the center and at r' the radius of the shaft 1. E is the point of intersection of the radii r and r' of the pin 12 and the shaft 1, respectively, which is located on the circumference. h designates the distance of this point E from center O—as measured on the connecting lines between the centers O and O'.

Figure 2:
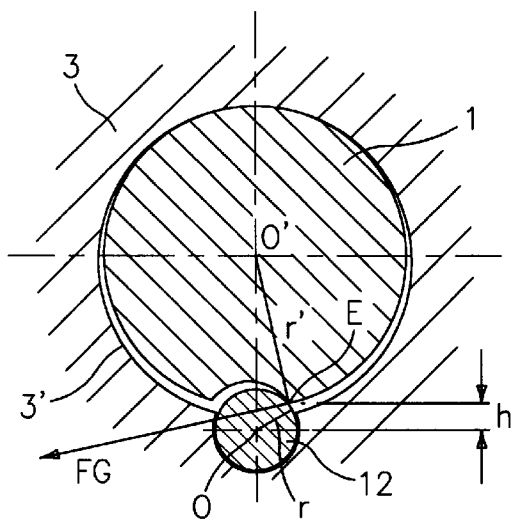
FIG. 2 shows a view similar to FIG. 1, but showing different quantities when the coupling is subjected to loads.
Figure 3:
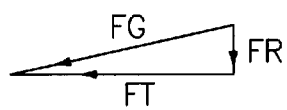
FIG. 3 shows a triangle of forces for the play in case of the coupling according to FIG. 2.

In FIGS. 2 and 3, FG designates the total entraining force between the shaft and the body complementary thereto, FT designates the tangential component of the entraining force at point E of the total entraining force FG, and FR designates the radial component of force FG also at point E.

The total force FG arising during operation of the torque transmitting device does not extent perpendicularly to the straight line O-O' connecting the centers of shaft 1 and pin 12, but extends tangentially with respect to r' in the above-defined point E. This provides an inclined direction between the tangent and the radius r, whose positional angle is dependent upon the diameter of the coupling arrangement, the shape of the entraining member or pin and on the position of the entraining member in relation to the shaft and the bore.

The directional angle of the force FG must be such that a sufficient entraining or transmitting force FT is created, but also a radial force FR sufficient for bringing the shaft into abutment with the bore wall; however, this must not take place excessively for avoiding the risk that deformations or other insufficiencies are caused there.

FIG. 2 in particular renders possible to define the useful range of this angle for an entraining member or pin 12 having a round cross-section. Similar considerations apparently hold for the event that the entraining member does not have a round cross-section but a different shape while including, however, a surface that is inclined with respect to the force FT.

The entraining member or pin 12 thus may have a circular cross-section, although other shapes are possible as long as the edge of engagement does not extend perpendicularly to the tangent of the bore on the connecting line between the centers O-O' or the tangent to the shaft on this connecting line, respectively. The description presented herein is based on the assumption that the entraining member is of circular cross-section, in particular for the reason that such a cross-section can be produced and employed easily and in advantageous manner, however without the present, specific description excluding other configurations. The entraining member with the cross-section of a round circle may be in the form of a pin, although other shapes are possible as well, e.g. a screw with cylindrical head, with the latter taking over the active part.

According to the invention, the center of the pin 12 must not be disposed on the circumference of bore/shaft. Accordingly, there may be two cases discriminated: in the first case, the pin 12 is disposed mainly in the coupling body having the bore, as shown in FIGS. 1 and 2; in the second case, the pin 12 is disposed mainly in the shaft, as can be seen from FIG. 4.

As mentioned hereinbefore, O is the central axis of the pin, O' is the centre of the shaft and thus also the theoretical center 3' of the bore for the shaft, E is the point of intersection between the two circumferential lines (with the centers O and O') and coincides with the active edge or the active location of the torque transmission coupling, h is the distance of point E from the diameter of pin 12 perpendicular to connecting line O-O'. The forces in the space between, FG, FT and FR are the forces defined hereinbefore.

Thus, for providing the coupling, the quantity h is determined first of all, this quantity being decisive for the penetration depth (r-h) of the pin and for the direction of the total force FG and its entraining component FT and positioning component FR.

For the first case of realization, in which the pin enters mainly into the bore of the body (FIGS. 1 and 2), the relations regulating the relationships between the various quantities in the range of validity of the invention, are defined by the following equations:

$$r - h + r' \cdot \left\{ 1 - \cos\left[\sin^{-1}\left(\frac{r}{r'} \cdot \sin\left[\cos^{-1}\left(\frac{h}{r}\right)\right]\right)\right] \right\} > 0 \quad (1)$$

$$h - r' \cdot \left\{ 1 - \cos\left[\sin^{-1}\left(\frac{r}{r'} \cdot \sin\left[\cos^{-1}\left(\frac{h}{r}\right)\right]\right)\right] \right\} > 0 \quad (2)$$

For the second case of realization, in which the pin is disposed mainly within the shaft (FIG. 4) and for which the same symbols are used, the equations defining the relationships between the various quantities are as follows:

$$r - h + r' \cdot \left\{ 1 - \cos\left[\sin^{-1}\left(\frac{r}{r'} \cdot \sin\left[\cos^{-1}\left(\frac{h}{r}\right)\right]\right)\right] \right\} > 0 \quad (3)$$

$$h - r' \cdot \left\{ 1 - \cos\left[\sin^{-1}\left(\frac{r}{r'} \cdot \sin\left[\cos^{-1}\left(\frac{h}{r}\right)\right]\right)\right] \right\} > 0 \quad (4)$$

When comparing the embodiments, one can see that (3)=(1) and (4)=(2).

This is why both cases are determined by the same relations.

For increasing—in both cases—the available entraining force and for thus rendering the coupling even more stable, it is possible to provide additional entraining members provided that the resulting radial force does not become zero.

The cross-section of the entraining member which hereinbefore before was described and shown as circular as this cross-section facilitates use most and allows a variation of the components of the force FG by mere alteration of the quantity h, may also take other shapes provided that these shapes present an area of application for the force FG that does not extend perpendicularly to the straight line connecting the two center axes of the shaft and the pin.

What is claimed is:

1. A torque-transmitting coupling assembly, said coupling assembly comprising:
   a) a body having a cylindrical wall bore;
   a cylindrical shaft extending into said body bore, said shaft having an outside diameter wall which provides a controlled degree of radial play between said shaft and said body bore when said assembly is not under torquing load;
   c) opposed first and second complementary curved wall concavities, said first concavity being formed in said body bore and said second concavity being formed on said shaft, said curved wall concavities combining to form a recess between said shaft and said body bore;
   d) a torque-transmitting entrainment key positioned within said recess, said entrainment key being snugly engaged by one of said concavities but loosely engaged by the other of said concavities when said assembly is not under torsion, said entrainment key having a curved outer wall which mimics the curved walls of said recess, said torque-transmitting entrainment key having an axis of elongation which is radially offset from said outside diameter wall of said shaft by a distance (h);
   e) said body, said shaft, and said entrainment key combining to create torsional drive contact areas between said key, said body and said shaft, which contact areas are associated with the concavity that the entrainment key loosely engages, and which contact areas are located at an intersection between the wall of said first concavity and said body bore wall, or at an intersection between the wall of said second concavity and the outer wall of said cylindrical shaft; and
   f) said entrainment key being operable to engage one of said torquing drive contact areas in the concavity which the entrainment key loosely engages when said assembly is subjected to torsion in a manner which creates an entraining force (FG) having a tangential component (FT) and a radial component (FR), said tangential component being operable to create torque between said body and said shaft, and said radial component being operable to force said body and said shaft into wall-to-wall abutting contact which continues so long as the assembly is subjected to torsion, said radial component (FR) being created by reason of the loose fit between said entrainment key and said first or second concavity and by reason of said radial offset (h).

2. The coupling assembly of claim 1 wherein said entrainment key is cylindrical.

3. A torque-transmitting coupling assembly, said coupling assembly comprising:
   a) a body having a cylindrical wall bore;
   b) a cylindrical shaft extending into said body bore, said shaft having an outside diameter wall which provides a controlled degree of radial play between said shaft and said body bore when said assembly is not under torquing load;

c) opposed first and second complementary curved wall concavities, said first concavity being formed in said body bore and said second concavity being formed on said shaft, said curved wall concavities combining to form a recess between said shaft and said body bore;

d) a torque-transmitting entrainment key positioned within said recess, said entrainment key being snugly engaged by one of said concavities but loosely engaged by the other of said concavities when said assembly is not under torsion, said entrainment key having a curved outer wall which mimics the curved walls of said recess said torque-transmitting entrainment key having an axis of elongation which is radially offset from said outside diameter wall of said shaft by a distance (h);

e) said body, said shaft, and said entrainment key combining to create torsional drive contact areas between said key, said body and said shaft, which contact areas are associated with the concavity that the entrainment key loosely engages; and f) said entrainment key being operable to engage one of said torsional drive contact areas when said assembly is subjected to torsion in a manner which creates an entraining force (FG) having a tangential component (FT) and a radial component (FR), said tangential component being operable to create torque between said body and said shaft, and said radial component being operable to force said body and said shaft into wall-to-wall abutting contact which continues so long as the assembly is subjected to torsional load, said radial component (FR) being created by reason of the loose fit between said entrainment key and said first or second concavity and by reason of said radial offset (h).

4. The coupling assembly of claim 3 wherein said entrainment key is cylindrical.

5. A torque-transmitting coupling assembly, said coupling assembly comprising:

a) a body having a cylindrical wall bore;

b) a cylindrical shaft extending into said body bore, said shaft having an outside diameter wall which provides a controlled degree of radial play between said shaft and said body bore when said assembly is not under torquing load;

c) opposed first and second complementary curved wall concavities, said first concavity being formed in said body bore and said second concavity being formed on said shaft, said curved wall concavities combining to form a recess between said shaft and said body bore;

d) a torque-transmitting entrainment key positioned within said recess, said entrainment key being snugly engaged by one of said concavities but loosely engaged by the other of said concavities thereby providing a controlled degree of rotational play between said shaft and said body bore when said assembly is not under torsion, said entrainment key having a curved outer wall which mimics the curved walls of said recess said torque-transmitting entrainment key having an axis of elongation which is radially offset from said outside diameter wall of said shaft by a distance (h);

e) said body, said shaft, and said entrainment key combining to create torsional drive contact areas between said key, said body and said shaft, which contact areas are associated with the concavity that the entrainment key loosely engages; and f) said entrainment key being operable to engage one of said torsional drive contact areas when said assembly is subjected to torsion in a manner which creates an entraining force (FG) having a tangential component (FT) and a radial component (FR), said tangential component being operable to create torque between said body and said shaft, and said radial component being operable to force said body and said shaft into wall-to-wall abutting contact which continues so long as the assembly is subjected to torsional load, said radial component (FR) being created by reason of the loose fit between said entrainment key and said first or second concavity and by reason of said radial offset (h).

6. The coupling assembly of claim 5 wherein said entrainment key is cylindrical.

7. A torque-transmitting coupling assembly, said coupling assembly comprising:

a) a body having a cylindrical wall bore;

b) a cylindrical shaft extending into said body bore, said shaft having an outside diameter wall which provides a controlled degree of radial play between said shaft and said body bore when said assembly is not under torquing load;

c) opposed first and second complementary curved wall concavities, said first concavity being formed in said body bore and said second concavity being formed on said shaft, said curved wall concavities combining to form a recess between said shaft and said body bore;

d) a torque-transmitting entrainment key positioned within said recess, said entrainment key being snugly engaged by one of said concavities but loosely engaged by the other of said concavities thereby providing a controlled degree of rotational play between said shaft and said body bore when said assembly is not under torsion, said entrainment key having a curved outer wall which mimics the curved walls of said recess said torque-transmitting entrainment key having an axis of elongation which is radially offset from said outside diameter wall of said shaft by a distance(h);

e) said body, said shaft, and said entrainment key combining to create torsional drive contact areas between said key, said body and said shaft, which contact areas are located at opposite ends of the concavity that the entrainment key loosely engages; and f) said entrainment key being operable to engage one of said torsional drive contact areas when said assembly is subjected to torsion in a manner which creates an entraining force (FG) having a tangential component (FT) and a radial component (FR), said tangential component being operable to create torque between said body and said shaft, and said radial component being operable to force said body and said shaft into wall-to-wall abutting contact whereby said shaft and said body are radially and rotationally fixed relative to each other so long as the assembly is subjected to torsional load, said radial component (FR) being created by reason of the loose fit between said entrainment key and said first or second concavity and by reason of said radial offset (h).

8. The coupling assembly of claim 7 wherein said entrainment key is cylindrical.

9. A torque transmitting coupling assembly comprising a shaft and a body complementary thereto, the shaft being received in a bore of said body, said shaft having a controlled degree of transverse play in said body bore; a cylindrical entraining member disposed between said shaft and said body, said entraining member being elongated in the axial direction of said shaft, and being disposed in mutually complementary facing recesses in the circumference of the shaft and the wall of the bore, respectively; said entraining member having an axis of elongation which is radically offset from an outside diameter wall of said shaft by a distance (h); said entraining member having an active edge whereat an entraining force is applied to said shaft or said body, the location of said active edge being dependent on the direction of rotation of said shaft and said body, and said entraining member having a surface which has an angle other than 90° with respect to a line which is tangent to the outer surface of the shaft at a point where, as seen in cross section, the outer surface of the shaft intersects a straight line which interconnects the centers of said shaft and said entraining member; whereby during torque-transmitting operation of the assembly, a radial force is exerted between the shaft and body thereby eliminating the transverse play between the shaft and the body, said radial force being created by reason of a loose fit between said entraining member and one of mutually complementary facing recesses, and by reason of said radial offset (h).

* * * * *